(12) United States Patent
Kubota

(10) Patent No.: US 12,127,544 B2
(45) Date of Patent: Oct. 29, 2024

(54) DETECTION APPARATUS, DETECTION SYSTEM, AND DETECTION METHOD

(71) Applicant: Syuji Kubota, Tokyo (JP)

(72) Inventor: Syuji Kubota, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 582 days.

(21) Appl. No.: 17/438,488

(22) PCT Filed: Mar. 10, 2020

(86) PCT No.: PCT/JP2020/010200
§ 371 (c)(1),
(2) Date: Sep. 13, 2021

(87) PCT Pub. No.: WO2020/184544
PCT Pub. Date: Sep. 17, 2020

(65) Prior Publication Data
US 2022/0142136 A1    May 12, 2022

(30) Foreign Application Priority Data

Mar. 14, 2019 (JP) ................ 2019-047525
Nov. 8, 2019 (JP) ................ 2019-202919

(51) Int. Cl.
*G01V 8/12* (2006.01)
*A01M 1/02* (2006.01)

(52) U.S. Cl.
CPC ............ *A01M 1/026* (2013.01); *G01V 8/12* (2013.01)

(58) Field of Classification Search
CPC ............ A01M 1/026; A01M 1/14; G01V 8/12
See application file for complete search history.

(56) References Cited

U.S. PATENT DOCUMENTS

| 2008/0187022 | A1 | 8/2008 | Bellifemine |
| 2012/0119091 | A1 | 5/2012 | Hong |
| 2015/0288454 | A1 | 10/2015 | Meinherz et al. |
| 2019/0187281 | A1* | 6/2019 | Weber-Grabau ............ H01J 37/32935 356/432 |

FOREIGN PATENT DOCUMENTS

| CN | 101218490 A | 7/2008 |
| CN | 102565803 A | 7/2012 |
| CN | 103353621 A | 10/2013 |
| EP | 1992224 A2 | 11/2008 |

(Continued)

OTHER PUBLICATIONS

Translation of WO2018/131853A1 (Year: 2018).*

(Continued)

*Primary Examiner* — David P Porta
*Assistant Examiner* — Mamadou Faye
(74) *Attorney, Agent, or Firm* — XSENSUS LLP

(57) ABSTRACT

A detection apparatus for detecting an object, the detection apparatus includes a housing having an inner surface whose reflectance is equal to or lower than a certain value; an emitter configured to emit infrared rays into the housing; a sensor configured to detect infrared rays; and one or more processors configured to adjust an intensity of reflected infrared rays according to a result of detection by the sensor.

14 Claims, 12 Drawing Sheets

(56) References Cited

FOREIGN PATENT DOCUMENTS

| | | | |
|---|---|---|---|
| JP | 7-123894 | | 5/1995 |
| JP | 10-157561 A | | 6/1998 |
| JP | 2002-214360 | | 7/2002 |
| JP | 2002214360 A | * | 7/2002 |
| JP | 2002-236053 | | 8/2002 |
| JP | 2002236053 A | * | 8/2002 |
| JP | 2011-114566 A | | 6/2011 |
| JP | 2016-217857 A | | 12/2016 |
| JP | 2017-192321 | | 10/2017 |
| JP | 2019-47525 A | | 3/2019 |
| JP | 2019-202919 | | 11/2019 |
| JP | 2020-071153 | | 5/2020 |
| WO | WO-2018131853 A1 * | 7/2018 | .............. A01M 1/02 |

OTHER PUBLICATIONS

Translation of JP2002214360A (Year: 2002).*
Translation of JP2002236053A (Year: 2002).*
European communication issued Jan. 26, 2023 in European Patent Application No. 20715209.1, 18pp.
Office Action issued Oct. 31, 2023 in Chinese Patent Application No. CN202080021352.9, 8 pages.
International Search Report issued on Jun. 18, 2020 in PCT/JP2020/010200 filed on Mar. 10, 2020, 13 pages.
Japanese Office Action issued Oct. 24, 2023, in corresponding Japanese Patent Application No. 2019-202919, 5 pages.

* cited by examiner

[Fig. 1]
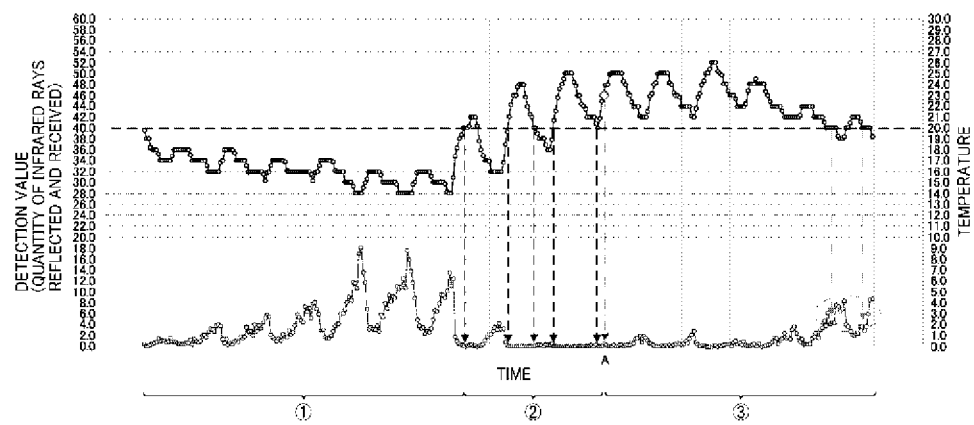
[Fig. 2]
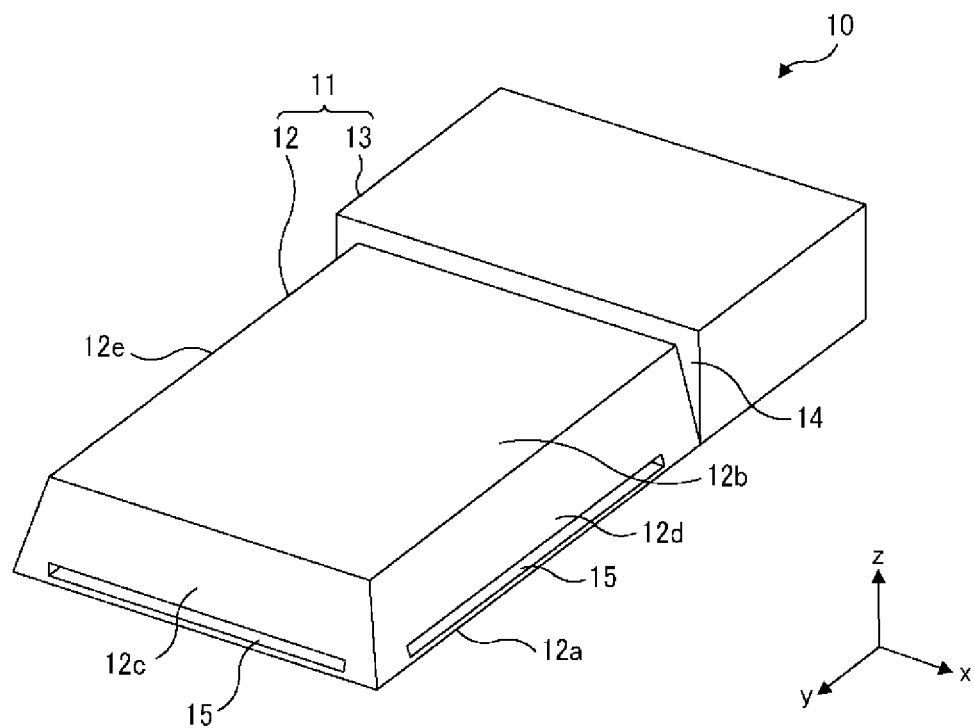

| TEMPERATURE (°C) | DETERMINED FREQUENCY (kHz) | PROVISIONAL FREQUENCY (kHz) | REFERENCE FREQUENCY (kHz) |
|---|---|---|---|
| ⋮ | – | – | 38.7 |
| ⋮ | – | – | |
| ⋮ | – | – | |
| 28 | – | – | 38.8 |
| 27 | – | – | |
| 26 | – | – | |
| 25 | – | – | 38.9 |
| 24 | – | – | |
| 23 | – | – | |
| 22 | – | – | 39.0 |
| 21 | – | – | |
| 20 | 39.1 | – | |
| 19 | – | – | 39.1 |
| 18 | – | – | |
| 17 | – | – | |
| 16 | – | – | 39.2 |
| 15 | – | – | |
| 14 | – | – | 39.3 |
| ⋮ | – | – | |
| ⋮ | – | – | |

[Fig. 12]

[Fig. 13]
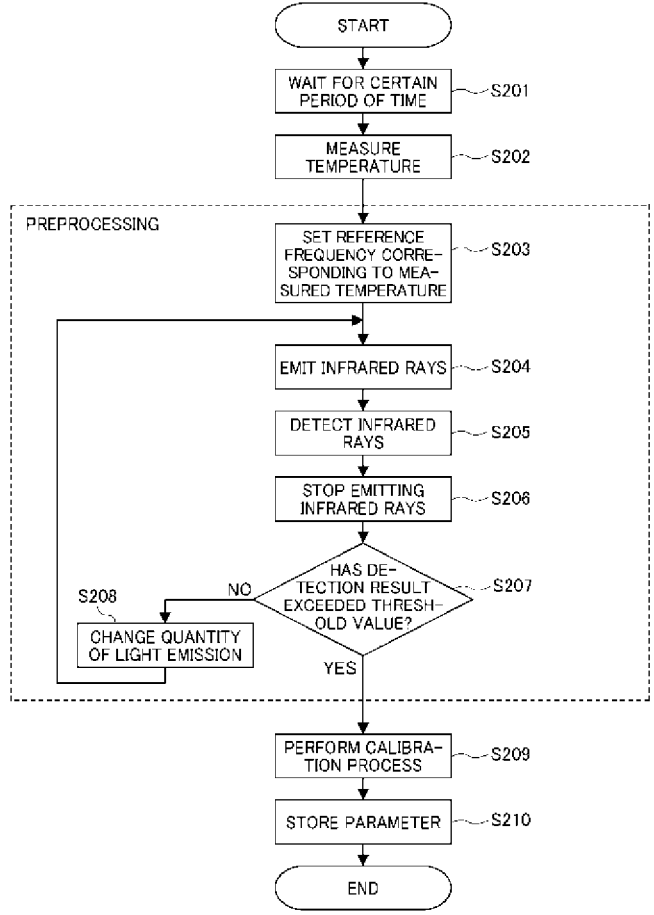
[Fig. 14]
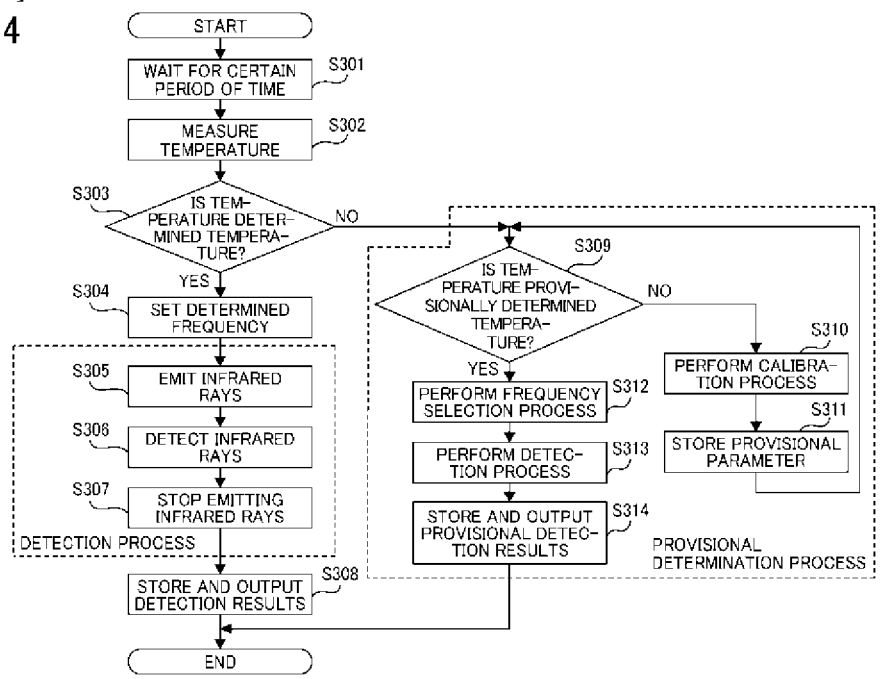

FIG. 15

| TEMPERATURE (°C) | DETERMINED FREQUENCY (kHz) | PROVISIONAL FREQUENCY (kHz) | REFERENCE FREQUENCY (kHz) |
|---|---|---|---|
| ⋮ | - | - | 38.7 |
| ⋮ | - | - | |
| ⋮ | - | - | |
| 28 | - | - | 38.8 |
| 27 | - | - | |
| 26 | 38.9 | - | |
| 25 | - | - | 38.9 |
| 24 | - | 38.9 | |
| 23 | 39.0 | - | |
| 22 | 39.0 | - | 39.0 |
| 21 | 39.0 | - | |
| 20 | 39.1 | - | |
| 19 | 39.1 | - | 39.1 |
| 18 | 39.1 | - | |
| 17 | - | - | |
| 16 | - | - | 39.2 |
| 15 | - | - | |
| 14 | - | - | 39.3 |
| ⋮ | - | - | |
| ⋮ | - | - | |

| TEMPERATURE (°C) | DETERMINED FREQUENCY (kHz) | PROVISIONAL FREQUENCY (kHz) | REFERENCE FREQUENCY (kHz) |
|---|---|---|---|
| ⋮ | - | - | 38.7 |
| ⋮ | - | - |  |
| ⋮ | - | - |  |
| 28 | - | - | 38.8 |
| 27 | - | - |  |
| 26 | 38.9 | - |  |
| 25 | 38.9 | - | 38.9 |
| 24 | 38.9 ← | - |  |
| 23 | 39.0 | - |  |
| 22 | 39.0 | - | 39.0 |
| 21 | 39.0 | - |  |
| 20 | 39.1 | - |  |
| 19 | 39.1 | - | 39.1 |
| 18 | 39.1 | - |  |
| 17 | - | - |  |
| 16 | - | - | 39.2 |
| 15 | - | - |  |
| 14 | - | - | 39.3 |
| ⋮ | - | - |  |
| ⋮ | - | - |  |

[Fig. 18]

DETECTION APPARATUS, DETECTION SYSTEM, AND DETECTION METHOD

CROSS-REFERENCE TO RELATED APPLICATIONS

The present application is based on PCT filing PCT/JP2020/010200, filed Mar. 10, 2020, which claims priority to Japanese Patent Application 2019-047525, filed Mar. 14, 2019 and Japanese Patent Application 2019-202919, filed Nov. 8, 2019, the entire contents of each are incorporated herein by reference.

TECHNICAL FIELD

The present disclosure relates to an apparatus, a system, and a method for detecting an object.

BACKGROUND ART

As a technique for detecting an object, there is known a sensing technique using infrared rays (also called infrared light). Sensing methods using infrared rays include a method for detecting an object based on whether infrared rays are obstructed by the object passing between a light emitting part and a light receiving part for infrared rays and a method for detecting an object based on whether the quantity of light received by a light receiving part has been changed as a result of the object having reflected infrared rays emitted from a light emitting part (see, for example, PTL 1 and PTL 2).

CITATION LIST

Patent Literature

PTL 1: JP-2727293-B (JP-1995-123894-A)
PTL 2: JP-2017-192321-A

SUMMARY OF INVENTION

Technical Problem

However, in the former method, an object cannot be detected unless the object passes across a path of infrared rays. Thus, there is a need to provide multiple paths of infrared rays. This requires multiple sets of a light emitting part and a light receiving part. Accordingly, the disadvantage of the former method is cost increase.

Meanwhile, the latter method is based on observation of a change in the quantity of light having returned after being diffusely reflected in the space. This requires just a single set of a light emitting part and a light receiving part. Insect pests as an example of an object exist in various sizes in the process of growing. Thus, there is a need to increase the ratio of a maximum value to a minimum value of a change in light quantity (dynamic range) so as to distinguish between insect pests in various sizes. However, the latter method has a disadvantage in that when a dynamic range is increased, it is not possible to make a distinction as to whether a small change in light quantity has come from the size of an insect pest or from an error, leading to increase of detection errors.

The present disclosure has been made in view of the above, and an object of the present disclosure is to provide an apparatus, a system, and a method that can be provided at low cost and can reduce detection errors.

Solution to Problem

Example embodiments of the present disclosure include a detection apparatus for detecting an object. The detection apparatus includes a housing having an inner surface whose reflectance is equal to or lower than a certain value; an emitter configured to emit infrared rays into the housing; a sensor configured to detect infrared rays; and one or more processors configured to adjust an intensity of reflected infrared rays according to a result of detection by the sensor.

Advantageous Effects of Invention

According to one or more embodiments of the present disclosure, an apparatus, a system, and a method for detecting an object is provided at low cost and detection errors are reduced.

BRIEF DESCRIPTION OF DRAWINGS

The accompanying drawings are intended to depict example embodiments of the present disclosure and should not be interpreted to limit the scope thereof. The accompanying drawings are not to be considered as drawn to scale unless explicitly noted. Also, identical or similar reference numerals designate identical or similar components throughout the several views.

FIG. 1 is a diagram illustrating a relation between a detection value of infrared rays and temperature and time, according to an embodiment of the present disclosure.

FIG. 2 is a view of an example of the appearance of a detection apparatus, according to an embodiment of the present disclosure.

FIG. 11 is a diagram illustrating an example of a table for managing calibration values after the initial calibration process, according to an embodiment of the present disclosure.

FIG. 13 is a flowchart illustrating a flow of preprocessing, according to an embodiment of the present disclosure.

FIG. 14 is a flowchart illustrating examples of a calibration process and a detection process to be performed at regular time intervals, according to an embodiment of the present disclosure.

FIG. 15 is a diagram illustrating an example of a table for managing calibration values to be referred to during a frequency selection process, according to an embodiment of the present disclosure.

FIG. 17 is a diagram illustrating an example of a table for managing calibration values at the time of shifting provisional frequencies as determined frequencies, according to an embodiment of the present disclosure.

DESCRIPTION OF EMBODIMENTS

Figure 3:
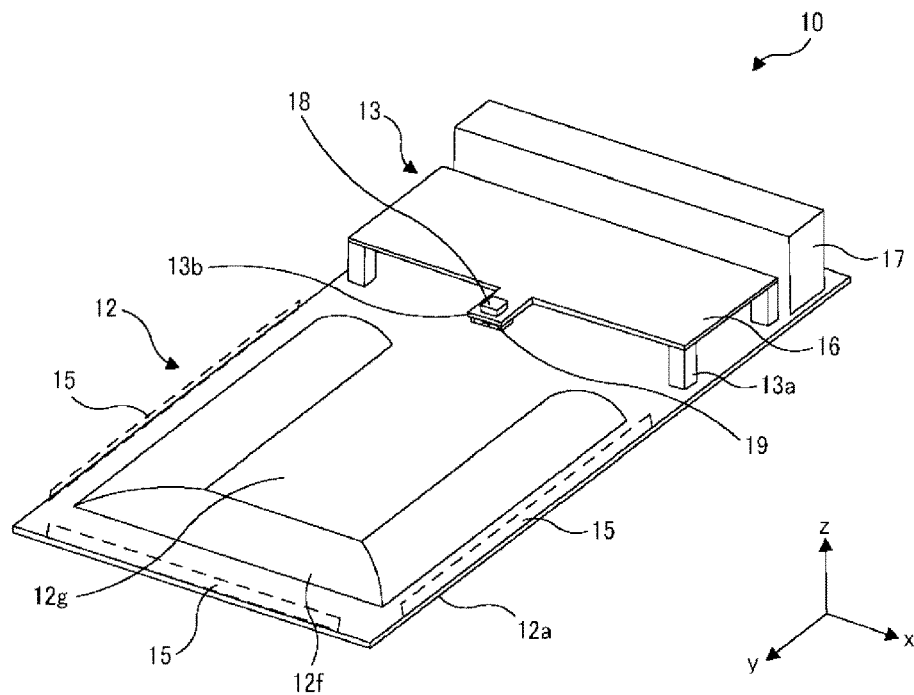
FIG. 3 is a perspective view of an example of the inside of the detection apparatus, according to an embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A detection apparatus according to the present embodiment is an apparatus that detects an object by using infrared rays, and is an apparatus that senses, by using infrared rays, detection of an insect pest in a small space close to a closed space such as an insect pest trap. In the present embodiment, an object to be detected is exemplified by a cockroach in some cases. However, an object to be detected is not limited to this example.

The detection apparatus emits infrared rays from an emission device, and captures a difference between infrared light reflected back in a space and infrared light having returned after being reflected from an insect pest in a state where the insect pest is in captivity. Thus, the detection apparatus detects the state of capture of the insect pest.

Here, a disadvantage associated with a detection apparatus employing such a method will be described. There is a need to adjust the intensity of reflected infrared rays, that is, the quantity of infrared light reflected back (the quantity of infrared light received after being reflected back) such that a range in which it is possible to detect a difference between the case where an insect pest has not been captured and the case where an insect pest has been captured falls within the dynamic range of a detection device for infrared rays. In particular, insect pests ranges from small ones of several millimeters in size to large ones of several centimeters in size in the process of growing. This requires a dynamic range to be sufficiently large to detect such a difference in size.

Meanwhile, a change in light quantity is small in the case of detecting a small insect pest of several millimeters in size.

Thus, when a dynamic range is increased, it is not possible to make a distinction as to whether a small change in light quantity is due to capture of an insect pest or due to an error, leading to increase of detection errors.

Examples of errors include an error in the molding of a housing that forms a space for capturing insect pests, characteristic errors of the emission device and the detection device, an error in installation of the emission device and the detection device, an error in accuracy of a control device (an electronic circuit such as a central processing unit (CPU)) that controls the emission device and the detection device, and a change in light quantity due to temperature change. Among these errors, errors other than an error due to temperature change are static errors inherent in the apparatus.

It is possible to perform correction before performing a detection process to reduce static errors and improve accuracy in detecting insect pests.

Generally, in the case of a light-emitting diode (LED) to be used as a light source of the emission device, the quantity of light decreases as the temperature increases, and the quantity of light increases as the temperature decreases. This is the characteristic of an LED. In addition, the output values of the electronic circuit and the detection device also vary due to temperature change. Therefore, the temperature characteristics of the entire apparatus need to be taken into consideration. The temperature changes dynamically. A change in light quantity due to temperature change is sufficiently larger than a change in light quantity required to detect an insect pest of several millimeters in size. Therefore, in the case where correction is simply performed before a detection process is performed as in the case of the static errors described above, many detection errors occur, and an insect pest cannot be accurately detected.

FIG. 1 is a diagram illustrating a relationship between a detection value of infrared rays and temperature and time as a result of actual testing. A test is started at an ambient temperature of 20° C. Adjustment (calibration) is performed so as to reduce static errors inherent in the apparatus. Thus, the quantity of reflected infrared light (the quantity of infrared light reflected and received) as a detection value is set to a threshold value (0).

When the test is started, the temperature changes over time. In section 1, the temperature gradually decreases while fluctuating. The quantity of light increases as the temperature decreases. The temperature is once returned to 20° C. Then, in section 2, the temperature gradually increases while fluctuating. The quantity of light is equal to or lower than the threshold value when the temperature is higher than 20° C. In FIG. 1, even if the quantity of light has a negative value, the value of light quantity is shown as 0. Thus, it is unknown whether the quantity of light actually has a negative value.

When the temperature reaches 23° C. (a point indicated by A in the drawing), an object of several millimeters in size is let in. In section 3, the object is let in and kept as it is without changing the position of the object. When the object is let in, the temperature is fluctuating significantly. However, the fluctuation is gradually reduced, and the temperature decreases.

In FIG. 1, when the temperature is at, for example, 23° C., that is, when the temperature is higher than 20° C., the quantity of light is equal to or lower than the threshold value. Meanwhile, the quantity of light increases when the temperature decreases to approximately 20° C. to achieve an environment close to the environment in which calibration was performed. This is because when the temperature is higher than the calibration temperature, that is, 20° C., the quantity of light to be emitted from the light source of the emission device decreases and thus, the quantity of light that returns after being reflected from the object also decreases. Therefore, even if the object is let in, the object cannot be detected unless the temperature returns to the calibration temperature of 20° C.

For these reasons, there is a need to perform an initial calibration for reducing static errors to obtain a calibration parameter for adjusting the quantity of light for each temperature, before performing a detection process.

The detection apparatus according to the present embodiment has the function of adjusting the quantity of light to be reflected back. With this function, it is possible to perform initial calibration and obtain a calibration parameter for each temperature. As a result, object detection errors due to environmental changes or environmental errors can be reduced. In addition, it is sufficient to provide a single set of the emission device and the detection device corresponding to the conventional light emitting part and light receiving part, respectively. It is thus possible to provide the detection apparatus at low cost.

The detection apparatus according to the present embodiment will be described in detail with reference to the drawings. FIG. 2 is a view of an example of the appearance of the detection apparatus. A detection apparatus 10 includes a housing 11. The housing 11 includes an object detecting part 12 and a device part 13. Here, the detection apparatus according to the present embodiment is described as an apparatus including the object detecting part 12 and the device part 13. However, the detection apparatus according to the present embodiment is not limited to such an apparatus. For example, a part or all of the device part 13 is divided into one or more devices to provide a detection system including a plurality of devices.

When the detection system includes a plurality of devices, the devices need not be directly connected to each other with a cable or the like, and may be connected via one or more networks. Furthermore, the network may be either a wired network or a wireless network.

Each of the object detecting part 12 and the device part 13 is in a box shape, and has a space inside. The object detecting part 12 and the device part 13 are adjacent to each other while being separated from each other by a partition wall 14. The internal space of the object detecting part 12 serves as a detection space. The object detecting part 12 has a trapezoidal outer shape. The device part 13 has a rectangular parallelepiped outer shape. Note that these shapes are examples and the shapes of the object detecting part 12 and the device part 13 are not limited to these examples.

The object detecting part 12 includes a bottom wall 12a, an upper wall 12b, and side walls 12c to 12e. The detection space is an internal space surrounded by the bottom wall 12a, the upper wall 12b, the side walls 12c to 12e, and the partition wall 14.

When the detection apparatus 10 is placed on a placement surface, the bottom wall 12a is located at the bottom in contact with the placement surface. The upper wall 12b is disposed away from the bottom wall 12a and located above the bottom wall 12a such that the upper wall 12b faces the bottom wall 12a. The side walls 12c to 12e are continuous with the bottom wall 12a and the upper wall 12b. The side walls 12c to 12e and the partition wall 14 are provided around the detection space. The side walls 12c to 12e are inclined so as to taper the detection space from the bottom wall 12a to the upper wall 12b.

Each of the side walls 12c to 12e is provided with an opening 15 in a lower portion continuous with the bottom wall 12a. The opening 15 is in an elongated rectangular shape (slit shape) extending along the edge of the bottom wall 12a. The opening 15 serves as an entrance for an insect pest to enter the internal detection space from the outside.

The housing 11 is made of a non-metallic material and has a black color such that the reflectance of infrared rays on an inner surface facing the detection space is equal to or lower than a certain value such as 0.1%. Examples of the material include plastic, rubber, and ceramic. Plastic such as acrylonitrile butadiene styrene copolymer resin (ABS resin) can be used for weight saving and low-cost production. The reflectance is the ratio of the luminous flux of reflected light to the luminous flux of incident light on a specific surface. The housing 11 may be made of a material having a reflectance exceeding 0.1%, and may have the inner surface covered with a plate, sheet, film, paint, or the like having a reflectance of 0.1% or less. The color is preferably black so as to reduce reflectance, but may be dark brown or navy blue.

Figure 4:
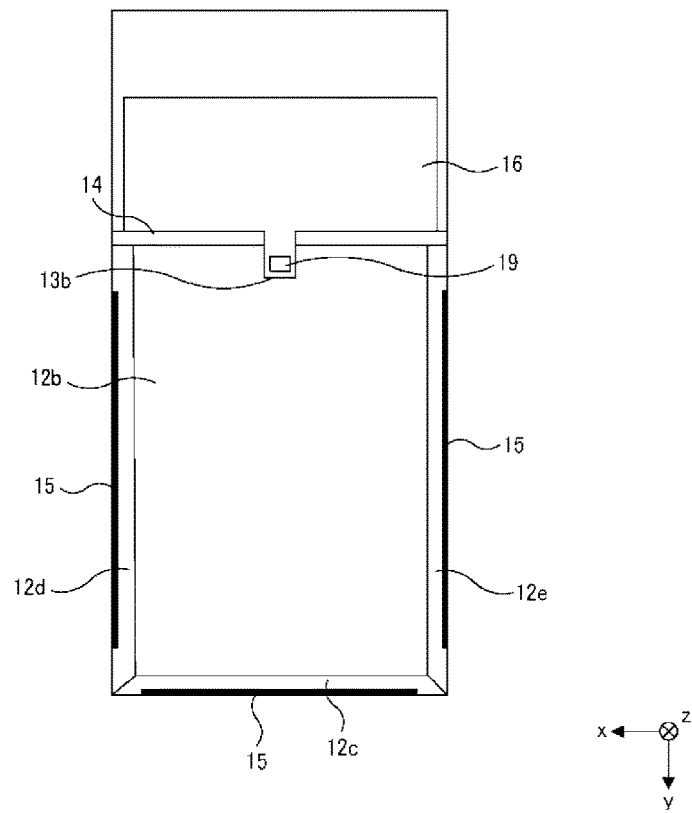
FIG. 4 is a plan view of an example of the inside of the detection apparatus, according to an embodiment of the present disclosure.
Figure 5:
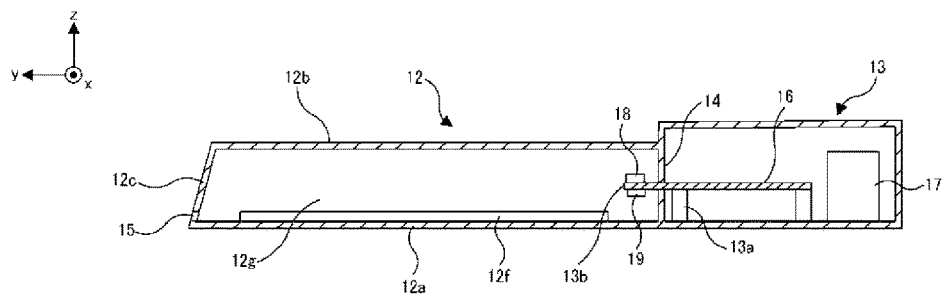
FIG. 5 is a cross-sectional view of an example of the detection apparatus, according to an embodiment of the present disclosure.

FIG. 3 is a perspective view of an example of the inside of the detection apparatus. FIG. 4 is a plan view of an example of the inside of the detection apparatus. FIG. 3 is a perspective view of the inside as seen from the upper wall 12b side. FIG. 4 is a plan view of the inside as seen from the bottom wall 12a. In these drawings, directions are defined as follows. The short-side direction of the bottom wall 12a is defined as an x-axis direction. The long-side direction of the bottom wall 12a is defined as a y-axis direction. The upward direction, that is, a direction from the bottom wall 12a to the upper wall 12b is defined as a z-axis direction. FIG. 5 is a cross-sectional view of the housing 11 taken along the y-axis direction.

The object detecting part 12 includes a raised portion 12f that protrudes in the z-axis direction from the inner surface of the bottom wall 12a. The raised portion 12f is made of the same material as the housing 11. The raised portion 12f may be made of a material different from the material of the housing 11, and may be integrated with the bottom wall 12a. The raised portion 12f extends in a belt shape along the three openings 15, and is disposed in the vicinity of the openings 15. The openings 15 are provided along the edges of the bottom wall 12a. This is to prevent infrared rays from being emitted to the outside through the openings 15, and to absorb infrared rays entering from the outside to the inside through the openings 15.

The raised portion 12f is in a U-shape when viewed from above, but is not limited to this shape. As with the housing 11, the raised portion 12f may be made of a material having an infrared reflectance of 0.1% or less. Alternatively, the raised portion 12f may be made of a material having a reflectance exceeding 0.1%, and may have a surface covered with a plate, sheet, film, paint, or the like having a reflectance of 0.1% or less. In addition, the raised portion 12f may be colored in black, dark brown, navy blue, or the like as with the housing 11.

For example, the distance between the openings 15 and the raised portion 12f and the z-axis dimension of the raised portion 12f protruding in the z-axis direction can be determined according to the shapes and dimensions of the openings 15 and desired prevention effects described above.

The device part 13 includes a control board 16 and a power source 17. The control board 16 controls the entire detection apparatus 10. The power source 17 supplies power that the control board 16 requires to operate.

The control board 16 is supported by support legs 13a on the bottom wall 12a, and is disposed between the upper wall 12b and the bottom wall 12a of the housing 11. The control board 16 includes a protrusion 13b in a plate-like shape. The protrusion 13b passes through the partition wall 14, and extends in the y-axis direction to a detection space 12g. The protrusion 13b has an upper surface on which an emission device 18 is disposed and a lower surface on which a detection device 19 is disposed. The detection device 19 detects infrared rays The emission device 18 includes an infrared LED and a prism. The infrared LED emits infrared rays having a wavelength range of approximately 700 to 2,500 nm in the y-axis direction. The optical axis of the infrared LED may be parallel to the y-axis direction, or may be inclined at a predetermined angle with respect to the y-axis direction. The emission device 18 is an example of an emitter.

The prism is disposed on the optical axis of the infrared LED such that the prism and the infrared LED are spaced apart. The prism has a semicylindrical side surface, and emits incident infrared rays such that the infrared rays are radially diffused along an x-y plane. As a result, infrared rays are emitted in the entire detection space 12g.

The detection device 19 is, for example, an infrared sensor, and outputs a signal indicating the intensity of received infrared rays. An infrared photodiode, an infrared phototransistor, or the like can be used as the infrared sensor. The detection device 19 receives infrared rays reflected from the side walls 12c to 12e and the like back to the detection device 19 after being emitted from the emission device 18. Then, the detection device 19 converts the received infrared rays into a signal indicating the intensity of the received infrared rays, and outputs the signal. The detection device 19 is an example of a sensor.

Figure 6:
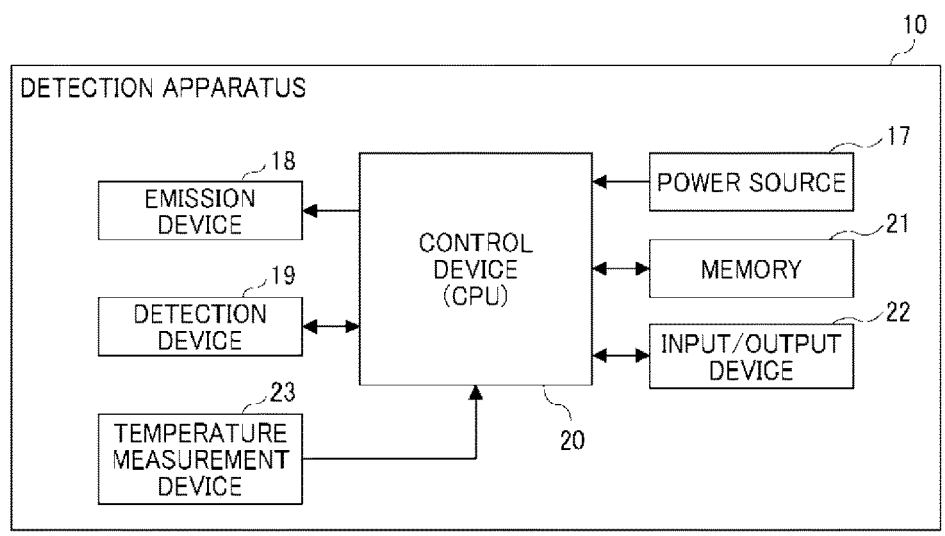
FIG. 6 is a diagram illustrating an example of a hardware configuration of the detection apparatus, according to an embodiment of the present disclosure.

FIG. 6 is a diagram illustrating an example of the hardware configuration of the detection apparatus. The detection apparatus 10 includes, as hardware, the emission device 18, the detection device 19, the power source 17, a control device 20, a memory 21, an input/output device 22, and a temperature measurement device 23.

The control device 20 is implemented by a CPU or the like. The control device 20 executes programs stored in the memory 21 to perform overall control of the detection apparatus 10, an initial calibration process and a detection process to be described below, and the like. The control device 20 is an example of one or more processors. The memory 21 functions as a storage unit, and stores data such as a table to be described below and detection results, in addition to programs. The power source 17 is a storage battery or the like, and supplies power to the control device 20. The input/output device 22 is a communication interface (I/F) or the like, and controls communication with an external server or the like. The temperature measurement device 23 is a temperature sensor or the like, and measures temperature in the housing 11 (detection space). Note that the control device 20 is not limited to a device that reads a program from the memory 21 and executes the program to perform control or the like. The control device 20 may include one or more circuits intended exclusively for control or each process.

Figure 7:
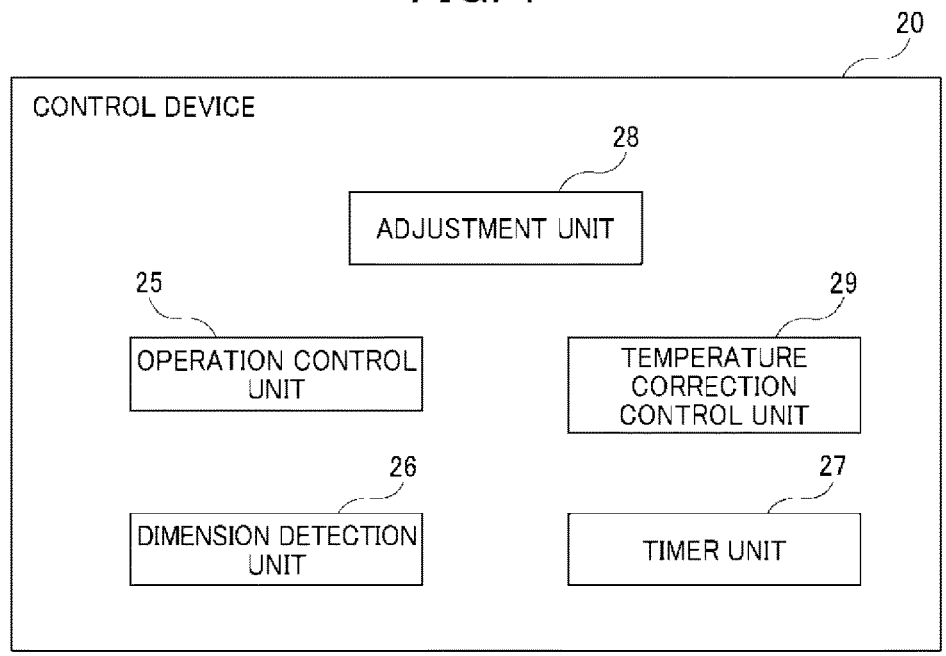
FIG. 7 is a block diagram illustrating an example of a functional configuration of the detection apparatus, according to an embodiment of the present disclosure.

FIG. 7 is a block diagram illustrating an example of the functional configuration of the detection apparatus. The detection apparatus 10 includes an operation control unit 25, a dimension detection unit 26, a timer unit 27, an adjustment unit 28, and a temperature correction control unit 29, as functional units to be implemented by the control device 20.

The operation control unit 25 controls the overall operation of the detection apparatus 10. The operation control unit 25 supplies the power supplied from the power source 17 to each constituent element, and controls, for example, operation of the emission device 18 for turning on and off the light source and detection operation of the detection device 19. The operation control unit 25 determines the presence or absence of an insect pest based on an infrared ray reception signal output from the detection device 19 when the detection device 19 detects infrared rays. When an insect pest enters the housing 11, infrared rays reflected from the insect pest are received. This causes a change in an output signal to be output. The operation control unit 25 determines the presence or absence of an insect pest based on the presence or absence of the change.

The dimension detection unit 26 detects the dimensions of an insect pest present in the housing 11 based on the infrared ray reception signal output from the detection device 19. The dimension detection unit 26 recognizes the size of an insect pest having entered, from a difference between signals issued before and after the insect pest entered. The dimension detection unit 26 holds a table or the like so as to detect dimensions corresponding to the difference between the signals. Thus, the dimension detection unit 26 can use the table or the like to calculate the size of the insect pest. Note that the dimension detection unit 26 can perform a process for detecting dimensions merely in the case where an insect pest has been detected by the operation control unit 25.

The timer unit 27 measures time, and outputs the measured time. The operation control unit 25 instructs the temperature measurement device 23 to measure the current temperature in the housing 11, based on the measured time output from the timer unit 27. Note that the operation control unit 25 may be configured as follows. The operation control unit 25 causes the temperature measurement device 23 to constantly monitor the temperature and output a signal when the temperature reaches a specified value. The operation control unit 25 thus receives a notification to the effect that the temperature has reached the specified value.

In response to receiving an instruction from the operation control unit 25, the adjustment unit 28 makes an investigation to obtain a calibration parameter (calibration value) for adjusting the quantity of infrared rays with respect to temperature as needed.

The temperature correction control unit 29 determines whether the calibration value found by the adjustment unit 28 is valid based on the temperature output from the temperature measurement device 23. If a calibration value is found by the adjustment unit 28 in a state where no insect pest is present in the housing 11, the temperature correction control unit 29 determines that the calibration value is valid. Thus, the temperature correction control unit 29 causes the memory 21 to store the calibration value as a determined calibration value in association with the temperature output from the temperature measurement device 23. When the memory 21 stores no determined calibration value for the temperature output from the temperature measurement device 23, the temperature correction control unit 29 causes the memory 21 to store the calibration value found by the adjustment unit 28 as a provisional calibration value in association with the temperature. The provisional calibration value is a calibration value validity of which cannot be determined at this point of time.

The temperature correction control unit 29 notifies the operation control unit 25 of the determined calibration value and a reference value (to be described below) stored in association with the temperature output from the temperature measurement device 23. The operation control unit 25 sets the notified calibration value, and controls the operation of the emission device 18 or the detection device 19 to perform a detection process. The temperature correction control unit 29 changes the provisional calibration value stored in the memory 21 to a determined calibration value according to the result of the detection process.

Figure 8:
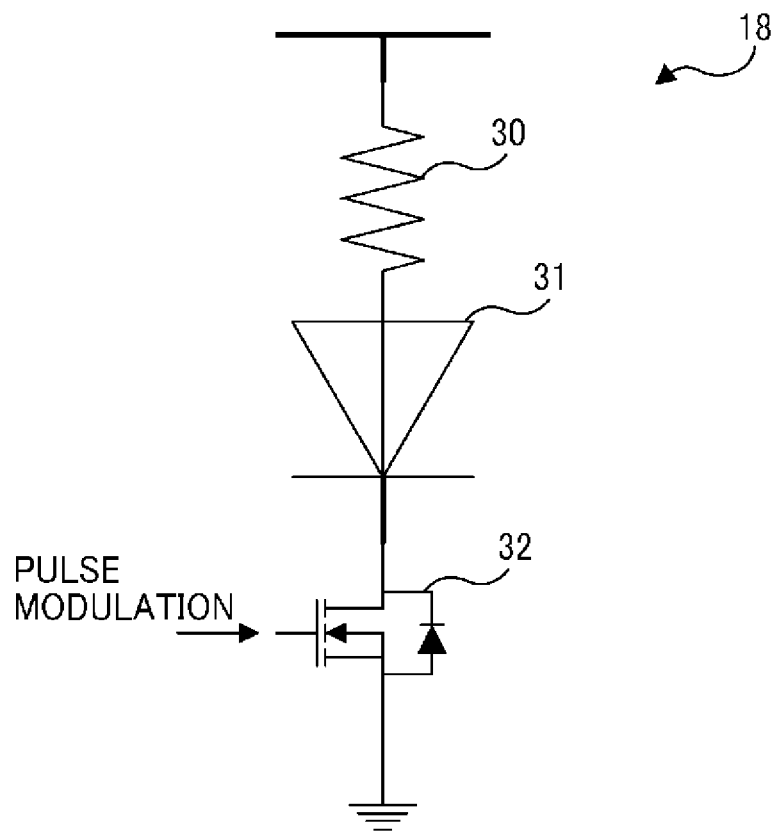
FIG. 8 is a diagram illustrating a configuration example of an emission device included in the detection apparatus, according to an embodiment of the present disclosure.

FIG. 8 is a diagram illustrating a configuration example of the emission device 18. The emission device 18 includes a resistor 30, an infrared LED 31, and a switching element 32. The resistor 30 is a current-limiting resistor for preventing excessive current from flowing to the infrared LED 31. As a light source, the infrared LED 31 emits infrared rays when supplied with current.

The switching element 32 functions as a switch. The switching element 32 turns the switch on and off to control current such that current flows to or does not flow to the infrared LED 31. The switching element 32 is, for example, an n-metal-oxide-semiconductor field-effect transistor (MOSFET). The n-MOSFET has three regions named gate, drain, and source. When a voltage applied between the gate and source exceeds a threshold value, current flows from the drain to the source to achieve a state in which the switch is on. When the voltage is below the threshold value, no current flows from the drain to the source to achieve a state in which the switch is off. The infrared LED 31 is connected to the drain side of the n-MOSFET. The infrared LED 31 is on when the switch is on. The infrared LED 31 is off when the switch is off.

The emission device 18 modulates the emitted infrared rays so as to distinguish the emitted infrared rays from natural infrared rays. In order to implement the modulation, a pulse-modulated voltage is applied to the gate of the n-MOSFET. For example, a pulse-modulated voltage with a frequency of 38 kHz is applied to the gate.

Figure 9:
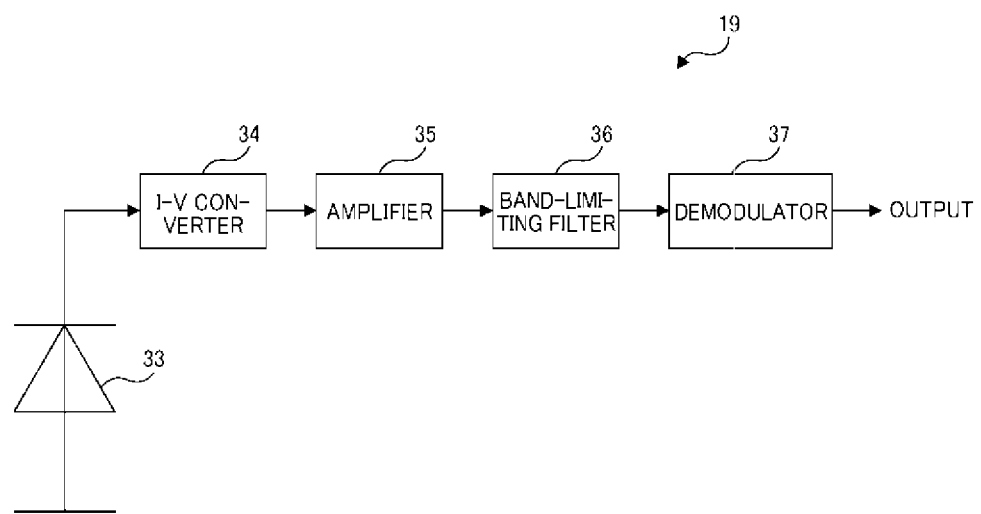
FIG. 9 is a diagram illustrating a configuration example of a detection device included in the detection apparatus, according to an embodiment of the present disclosure.

FIG. 9 is a diagram illustrating a configuration example of the detection device 19. The detection device 19 includes a PIN photodiode 33, an I-V converter 34, an amplifier 35, a band-limiting filter 36, and a demodulator 37.

The PIN photodiode 33 has high-speed response characteristics, and converts the modulated infrared rays into current. As long as infrared rays can be converted into current, the constituent element indicated by reference numeral 33 is not limited to the PIN photodiode. A PN photodiode, an avalanche photodiode (APD) photodiode, or the like may be used instead of the PIN photodiode.

The I-V converter 34 converts current from the PIN photodiode 33 into voltage. The amplifier 35 uses the voltage as a signal, and amplifies the signal with a set amplification factor. The band-limiting filter 36 adjusts a center frequency to a modulation frequency of, for example, 38 kHz. Thus, the band-limiting filter 36 passes no other signals but signals in the frequency band, and attenuates signals other than the signals in the frequency band. The demodulator 37 converts the signal having passed through the band-limiting filter 36 into an output signal.

Infrared rays emitted from the emission device 18 are partially absorbed in the housing 11, partially leak out of the housing 11, and are partially reflected to reach the detection device 19. The detection device 19 detects a change in the housing 11 based on a change in the quantity of infrared rays reflected and received. The following method can be adopted as a method for detecting this change. For example, reflected light in an initial state is kept constant, and the value of the quantity of light then received is set as a threshold value. When the value of the quantity of received light exceeds the threshold value, it is determined that an object such as an insect pest has entered the housing 11 and reflection from the object has occurred. Note that the above-described method is an example, and the method for detecting the change is not limited to this example. Hereinafter, detailed description will be provided on the assumption that the above-described method is adopted.

In order to implement this method, there is a need to adjust the quantity of light to be received, which varies between apparatuses, to a threshold value in the initial state. The quantity of light to be received may be adjusted on the infrared emitting side or may be adjusted on the light receiving side.

Examples of methods for adjusting, on the emitting side, the quantity of light to be received include a method for adjusting the amount of current to be supplied to the infrared LED 31 and a method for changing the modulation frequency of 38 kHz for voltage (rectangular wave) to be applied to the gate of the switching element 32. The latter method uses the fact that the quantity of light changes according to the filter characteristics of the band-limiting filter 36 of the detection device 19. Furthermore, a method for changing a pulse width of 38 kHz for voltage (rectangular wave), which is applied to the gate of the switching element 32, to adjust pulse demodulation (pulse detection) sensitivity on the light receiving side can also be cited as an example of a method for adjusting the quantity of light to be received, on the emitting side.

A method for adjusting the amplification factor set in the amplifier 35 of the detection device 19 can be cited as an example of a method for adjusting the quantity of light to be received, on the light receiving side. These methods are examples. Thus, the method for adjusting the quantity of light to be received is not limited to these methods. Note that description will be provided below on the assumption that the above-described method for changing modulation frequency is adopted, which can be easily implemented by digital control.

Figure 10:
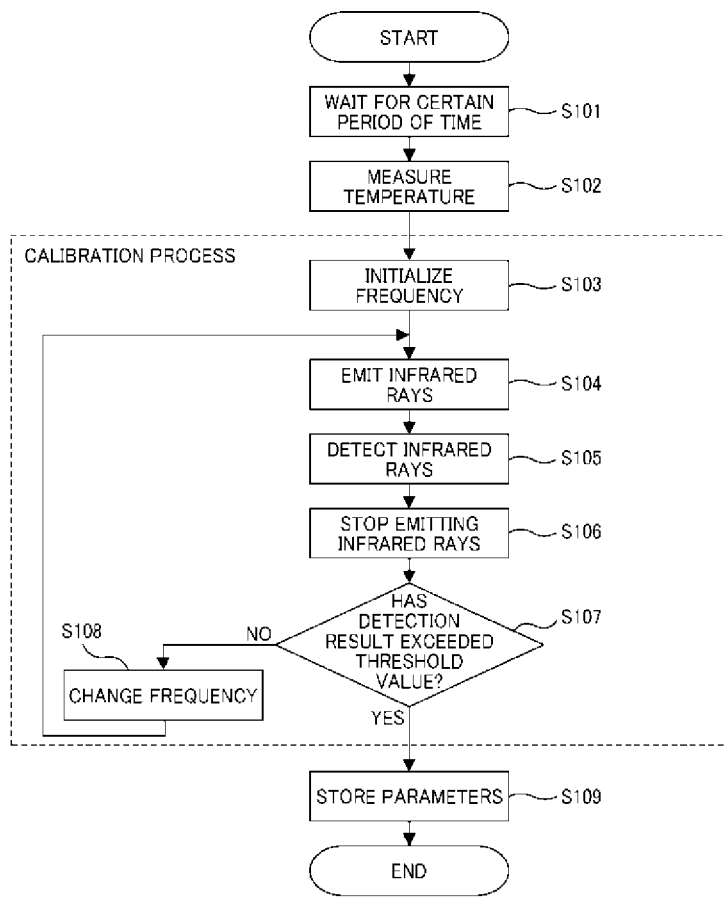
FIG. 10 is a flowchart illustrating an example of an initial calibration process to be performed by the detection apparatus, according to an embodiment of the present disclosure.

FIG. 10 is a flowchart illustrating an example of an initial calibration process. The initial calibration process is performed when the power to the detection apparatus 10 is turned on or when initialization is performed. This is because when the power is turned on or when initialization is performed, it is highly possible that no insect pest has entered the housing 11, and it is thus possible to consider that the housing 11 is in a state where no insect pest has entered.

The initial calibration process is started from step 100. In step 101, the detection apparatus 10 is kept on standby for a certain period of time until the characteristics of the sensor or the like to be used as the temperature measurement device 23 are stabilized. Whether the certain period of time has elapsed is determined based on time measured by the timer unit 27. This determination is made by the operation control unit 25.

After the elapse of the certain period of time, the process proceeds to step 102, where the operation control unit 25 instructs the temperature measurement device 23 to measure temperature. Receiving the instruction, the temperature measurement device 23 measures the current temperature. The temperature measured at this time is regarded as a temperature at the time of initial calibration. For ease of description, assume that the measured temperature is 20° C.

After the temperature measurement, the calibration process is started. In the calibration process, the adjustment unit 28 sets modulation frequency to an initial value to initialize the frequency in step 103. Gain, that is, the quantity of light to be received can be maximized at a modulation frequency of 38 kHz, based on the characteristics of the band-limiting filter 36 of the detection device 19. Based on the characteristics of the band-limiting filter 36, when the modulation frequency is higher or lower than 38 kHz, the quantity of light to be received decreases from the maximum quantity of light to be received. Therefore, after the calibration process, the quantity of light to be received is equal to the threshold value at two frequencies, that is, a frequency equal to or higher than 38 kHz and a frequency lower than 38 kHz. For this reason, the initial value of frequency may be 38 kHz, or may be sufficiently higher or sufficiently lower than 38 kHz. In this example, it is assumed that the initial value of frequency is set to, for example, 40 kHz as a sufficiently high value.

After setting the initial value, a search is made for a frequency at which the quantity of light to be received is equal to the threshold value. In step 104, the emission device 18 receives a voltage with the set frequency, and emits infrared rays according to the voltage. The frequency is set to 40 kHz, which is sufficiently higher than 38 kHz. Thus, the quantity of received light decreases to a sufficiently low value, and the quantity of reflected light decreases to zero.

In step 105, the detection device 19 waits for a certain period of time to elapse, and detects the quantity of received light as an accumulated value of the quantity of light received during the certain period of time. When the detection is completed, the emission device 18 is caused to stop emitting infrared rays in step 106.

Here, a received light quantity of 0 is considered a threshold value. When modulation frequency is reduced from 40 kHz to 38 kHz, the quantity of received light changes from 0 to a value larger than 0 at a specific frequency. The specific frequency at which the quantity of received light changes from 0 is regarded as a calibration value at a temperature of 20° C. In order to detect this change in the quantity of received light, there is a need to adjust the quantity of infrared emission so that a sufficiently large quantity of received light can be detected at least when frequency is set to a value that maximizes the quantity of light to be received.

In step 107, the adjustment unit 28 determines whether the quantity of received light as a detection result has exceeded the threshold value to determine whether the set frequency is equal to the frequency at which the quantity of received light changes from 0. If it is determined that the quantity of received light has not exceeded the threshold value, the process proceeds to step 108, where the adjustment unit 28 changes the frequency. Then, the process returns to step 104. Meanwhile, if it is determined that the quantity of received light has exceeded the threshold value, the calibration process is terminated, and the process proceeds to step 109.

In step 109, the adjustment unit 28 stores obtained calibration values in the memory 21, and the process ends in step 110. The calibration values are initial calibration values, and include values of frequency and temperature.

FIG. 11 is a diagram illustrating an example of a table for managing calibration values after the initial calibration process. The table shows a correspondence between each temperature and a frequency to be set at each temperature. Frequencies include a determined frequency, a provisional frequency, and a reference frequency.

The determined frequency is a calibration value obtained as a result of performing a calibration process in a state where no object has entered the housing 11 or in a state where it can be determined that no object has entered the housing 11. If it can be determined that a past provisional frequency was obtained in a state where no insect pest had entered or in a state where it could be determined that no insect pest had entered, the past provisional frequency is also included in the determined frequency.

The provisional frequency is a calibration value obtained when a calibration process is performed in a state where it cannot be determined that no object has entered the housing 11. The reference frequency is obtained as follows. A case error regarding the apparatus is not taken into consideration in an assumed value of frequency set at each temperature, measured and stored in advance. Therefore, a static case error (offset value) defined as follows is taken into consideration. The static case error (offset value) is a difference between a frequency value obtained at the time of the initial calibration and a frequency value measured at the same temperature as in the initial calibration and stored in advance. The same offset value is taken into consideration in obtaining a reference frequency based on an assumed value of frequency corresponding to each temperature in the entire temperature range. An individual difference (dynamic case error) in temperature characteristics is not taken into consideration in the reference frequency. Thus, the reference frequency is to be treated just as a reference value.

The assumed value of reference frequency may be a value previously stored in the table, but is not limited to such a value. For example, the assumed value of reference frequency may be calculated from a calculation formula representing temperature characteristics derived based on a value measured in advance at each temperature. An offset value obtained at the time of the initial calibration is taken into consideration also in the case of calculation based on the calculation formula. However, a column for reference frequency need not be provided in such a case.

When the calibration process is performed in the absence of an object in the housing 11, it is possible to determine a frequency for a measured temperature. Thus, the determined frequency is entered in a column for determined frequency. Accordingly, when it is determined that the frequency is 39.1 kHz at a measured temperature of 20° C. in the initial calibration process, the value "39.1 kHz" is entered in the field of a determined frequency corresponding to the temperature "20° C.", as illustrated in FIG. 11.

It is known that a cockroach is active at a temperature of approximately 20 to 32° C. Therefore, when an object is a cockroach as a kind of insect pest, a temperature range can be set to, for example, 0 to 45° C.

Incidentally, assume that the temperature characteristics of the assumed value are non-linear, and a non-linear curve representing the characteristics varies depending on adjustment parameters other than frequency. In such a case, there is a possibility that the assumed value varies significantly in the temperature range if a static case error (offset value) is simply taken into consideration. Examples of the adjustment parameters other than frequency include the pulse width of the above-described rectangular wave, the amount of current, and an amplification factor. The assumed value is merely used for an assumption. Meanwhile, when it takes time to adopt a frequency as a determined frequency, a detection result based on the assumed value serves as the basis for detection. In view of this, it is desirable that the amount of deviation of the assumed value be as small as possible.

When reception sensitivity is adjusted by use of modulation frequency, a characteristic curve regarding filter characteristics on the light receiving side, which represents the relationship between frequency and gain, corresponds to a curve representing reception sensitivity in an assumed temperature range. However, if the intensity of emission differs, the range of a characteristic curve to be used also differs. Thus, a deviation occurs in the assumed value.

Figure 12:
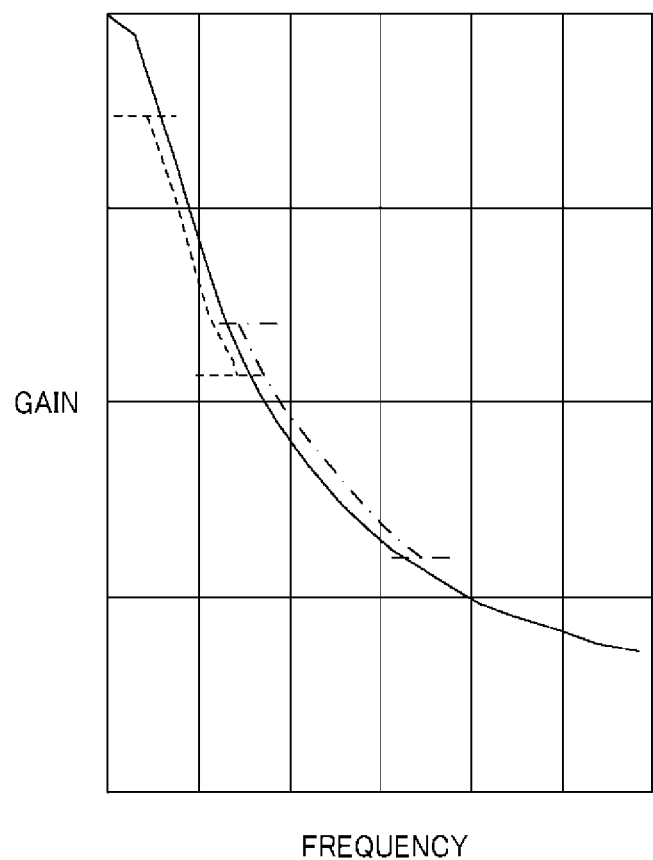
FIG. 12 is a graph illustrating an example in which the shape of a characteristic curve changes when gain is changed in different ranges in the characteristic curve on the light receiving side, according to an embodiment of the present disclosure.

FIG. 12 is a graph illustrating an example in which the shape of a characteristic curve changes when gain is changed in different ranges in the characteristic curve on the light receiving side. FIG. 12 illustrates the shapes of curves by a dotted line and an alternate long and short dash line to show that the shapes are different.

In order to eliminate such a deviation, preprocessing is performed before the initial calibration process. The preprocessing is for adjusting the quantity of light emission, that is, the quantity of infrared emission by another adjustment method so that the quantity of received light is equal to or less than a predetermined threshold value with an assumed value of frequency corresponding to a temperature at that time. Examples of the another adjustment method include a method for adjusting the amount of current.

Here, description will be provided on the assumption that an assumed value refers to the assumed value of frequency as one of the adjustment parameters and that the amount of current as another adjustment parameter is adjusted to set the amount of current obtained as a result of adjustment as a fixed value. However, adjustment parameters are not limited to the above. An adjustment parameter other than frequency, such as pulse width, the amount of current, or an amplification factor, may be selected. In addition, any parameter other than a parameter selected as the adjustment parameter may be selected as another adjustment parameter. It is also possible to select, as other adjustment parameters, two or more parameters other than the parameter selected as the adjustment parameter.

FIG. 13 is a flowchart illustrating the flow of preprocessing. Operation starts from step 200 when the power is turned on. In step 201, the detection apparatus 10 is kept on standby for a certain period of time until the characteristics of the sensor or the like to be used as the temperature measurement device 23 are stabilized.

After the elapse of the certain period of time, the process proceeds to step 202, where the operation control unit 25 instructs the temperature measurement device 23 to measure temperature. Receiving the instruction, the temperature measurement device 23 measures the current temperature.

After the temperature measurement, the preprocessing is started. The preprocessing is performed by a preprocessing unit. The preprocessing unit is implemented by, for example, the control device 20, which operates according to a program read from the memory 21. Alternatively, the preprocessing unit is implemented by one or more dedicated circuits. In step 203, the preprocessing unit sets a reference frequency corresponding to the temperature. In step 204, the preprocessing unit instructs the emission device 18 to receive a voltage with the set frequency and emit infrared rays according to the voltage.

In step 205, the preprocessing unit waits for a certain period of time to elapse, and instructs the detection device 19 to detect the quantity of received light as an accumulated value of the quantity of light received during the certain period of time. When the detection is completed, the emission device 18 is caused to stop emitting infrared rays in step 206.

In step 207, the preprocessing unit determines whether the quantity of received light as a detection result has exceeded the threshold value. If it is determined that the quantity of received light has not exceeded the threshold value, the process proceeds to step 208, where the preprocessing unit adjusts the amount of current to change the quantity of light emission. Then, the process returns to step 204. Meanwhile, if it is determined that the quantity of received light has exceeded the threshold value, the amount of current at that time is set as a fixed value, and the preprocessing is terminated. Then, the process proceeds to a calibration process in step 209. The calibration process has already been described with reference to FIG. 10. Thus, description of the calibration process is omitted here. After the calibration process, a parameter is stored in step 210, and the process ends in step 211.

The preprocessing performed in this way. Thus, even when the accuracy of adjustment of the quantity of light emission is low, a characteristic curve becomes close to a curve representing a certain degree of reception sensitivity as a result of adjustment of the quantity of light emission. Accordingly, deviation is reduced. It is thus possible to treat the amount of residual deviation as a linear offset. In this case, if initialization calibration is performed after the preprocessing, the amount of deviation can be significantly reduced.

FIG. 14 is a flowchart illustrating examples of a calibration process and a detection process to be performed at regular time intervals. The calibration process needs to be performed not only when the power to the detection apparatus 10 is turned on or when initialization is performed, but also after that. This is because temperature in the housing 11 changes while the detection apparatus 10 is operating. Therefore, there is a need to check a change in the state in the housing 11 at regular time intervals. The detection process may be performed at any time. It is also possible to perform the detection process together with the calibration process to be performed at regular time intervals.

The timer unit 27 generates a trigger signal at regular time intervals. The process starts from step 300. In step 301, the operation control unit 25 waits for a trigger signal to be generated, and instructs the temperature measurement device 23 to measure temperature, in response to generation of the trigger signal. In step 302, the temperature measurement device 23 receives the instruction, and measures temperature in the housing 11.

In step 303, the temperature correction control unit 29 determines whether the temperature measured by the temperature measurement device 23 is a determined temperature. Whether the temperature is a determined temperature can be determined based on determination as to whether a value has been set in the field of a determined frequency, as a valid frequency, corresponding to the temperature in the table for managing calibration values.

If it is determined in step 303 that the temperature is a determined temperature, the temperature correction control unit 29 refers to the table in step 304, acquires a determined frequency corresponding to the temperature, and notifies the operation control unit 25 of the determined frequency which has been acquired. The operation control unit 25 sets the determined frequency which has been notified, and controls the frequency of a voltage to be input to the emission device 18. In step 305, the emission device 18 receives a voltage with the set frequency, and emits infrared rays according to the voltage.

In step 306, the detection device 19 waits for a certain period of time to elapse, and detects the quantity of received light as an accumulated value of the quantity of light received during the certain period of time. When the detection is completed, the emission device 18 is caused to stop emitting infrared rays in step 307. In step 308, based on the quantity of received light, the operation control unit 25 and the dimension detection unit 26 output results of, for example, detection as to whether an insect pest has entered and detection of the approximate size of an insect pest if the insect pest has entered. The results of detection are stored in the memory 21, and the process ends in step 315.

If it is determined in step 303 that the temperature is not a determined temperature, the temperature correction control unit 29 determines in step 309 whether the temperature is a provisionally determined temperature. Whether the temperature is a provisionally determined temperature can be determined based on determination as to whether a value has been set in the field of a provisional frequency corresponding to the temperature in the table for managing calibration values.

If it is determined in step 309 that the temperature is not a provisionally determined temperature, the process proceeds to step 310, where the adjustment unit 28 performs a calibration process. The calibration process is a process from step 103 to step 108 in FIG. 10. After the calibration process is performed, the process proceeds to step 311, where the temperature correction control unit 29 stores a calibration value as a provisional parameter in the memory 21. Then, the process returns to step 309.

If it is determined in step 309 that the temperature is a provisionally determined temperature, the process proceeds to step 312, where the operation control unit 25 performs a frequency selection process. In the frequency selection process, there is selected a determined frequency or a reference frequency corresponding to a temperature close to the measured current temperature.

When there is a determined frequency corresponding to a temperature within a certain temperature range with respect to the current temperature, the determined frequency is selected. When there is a plurality of determined frequencies corresponding to temperatures within the certain temperature range, there is selected a determined frequency corresponding to a temperature closest to the current temperature from among the plurality of determined frequencies. In addition, when there is no determined frequency corresponding to a temperature within the certain temperature range, there is selected a reference frequency corresponding to a temperature within the certain temperature range. When there is a plurality of reference frequencies, there is selected a reference frequency corresponding to a temperature closest to the current temperature. The certain temperature range can be determined according to, for example, accuracy in setting frequency or the amount of change in the quantity of received light.

FIG. 15 is a diagram illustrating an example of the table for managing calibration values to be referred to during the frequency selection process. For example, assume that the current temperature is 17° C. Referring to the table, neither a determined frequency nor a reference frequency corresponding to the current temperature has been entered in the table. Assume here that the certain temperature range is 17±1° C. Then, temperatures of 16° C. and 18° C. are within the temperature range. The value "39.1 kHz" has been entered as a determined frequency at 18° C. Thus, the value "39.1 kHz" is selected. Meanwhile, a reference frequency of 39.2 kHz has been set at 16° C. However, the reference frequency is a reference value set without consideration of a case error in temperature characteristics. Therefore, priority is given to the determined frequency.

Assume that the current temperature is 15° C. Then, neither a determined frequency nor a reference frequency has been set at 15° C. Thus, frequencies at temperatures of 14° C. and 16° C. are referred to. No determined frequency has been entered at 14° C. or 16° C. However, reference frequencies have been entered at 14° C. or 16° C. Thus, a reference frequency corresponding to a temperature closest to the current temperature is selected. Although the temperatures have been simply described as 14° C. and 16° C. in FIG. 15, either of the reference frequencies is selected also in consideration of digits after the decimal point. For example, assume that the current temperature is 15.1° C. and that the above-described temperatures contained in the table are actually 14.2° C. and 15.7° C. which are within a range of 15.1±1° C. Then, there is selected, in consideration of digits after the decimal point, a reference frequency of 39.2 kHz corresponding to a temperature of 15.7° C. which is closest to the current temperature.

The table illustrated in FIG. 15 contains a frequency of 38.9 kHz entered in the column for provisional frequency, as a calibration value obtained in the calibration process performed when the measured temperature is 24° C.

Referring to FIG. 14 again, after a frequency is selected, the selected frequency is set for the emission device 18, in the frequency selection process. After the frequency selection process, a detection process is performed in step 313. The detection process is a process from step 305 to step 307. In step 314, based on the quantity of received light, the operation control unit 25 and the dimension detection unit 26 output provisional results of detection as to, for example, whether an insect pest has entered. The provisional results of detection are stored in the memory 21, and the process ends in step 315.

After the initial calibration process, the calibration process is performed at regular time intervals. If the measured temperature differs between each time point, no other frequency but a frequency determined by the initial calibration process is regarded as a determined frequency, and other frequencies are regarded as provisional frequencies. No detection process is performed in the initial calibration process. Thus, it is unclear whether an insect pest has entered the housing 11 at a temperature corresponding to the determined frequency, that is, a determined temperature.

If the measured temperature is a determined temperature, a detection process is performed for the first time here in the calibration process to be performed at regular time intervals. If it is detected in the detection process that no insect pest has entered, it can be determined that no insect pest had entered also in the calibration processes performed thus far. Therefore, provisional frequencies obtained in calibration processes performed thus far can be regarded as determined frequencies.

Meanwhile, assume that it is detected that an insect pest has entered, in a detection process performed when the measured temperature is a determined temperature. Then, detection results obtained thus far are provisional detection results, and cannot be used. This is because it is not possible to determine a time point at which the insect pest entered. Therefore, all provisional frequencies obtained thus far cannot be used as determined frequencies. Accordingly, all the provisional frequencies obtained thus far are invalid frequencies, and can be deleted. In this case, after removing the insect pest and performing initialization, the process can be restarted with the initial calibration process.

Figure 16:
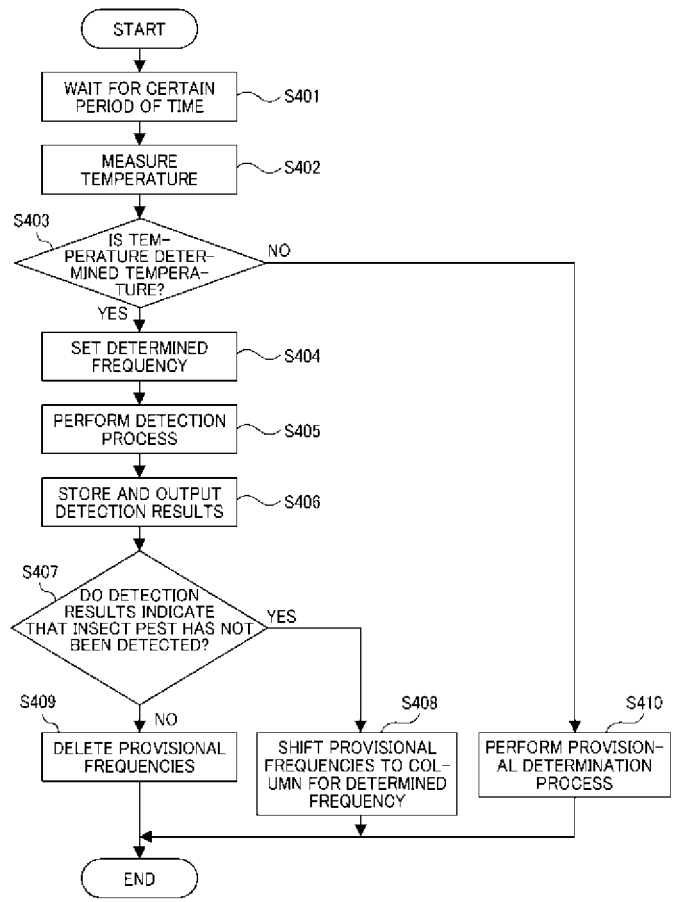
FIG. 16 is a flowchart illustrating an example of a process to be performed by the detection apparatus, for shifting provisional frequencies as determined frequencies, according to an embodiment of the present disclosure.

FIG. 16 is a flowchart illustrating an example of a process for shifting provisional frequencies as determined frequencies. The process starts from step 400. In step 401, the operation control unit 25 waits for the timer unit 27 to generate a trigger signal, and instructs the temperature measurement device 23 to measure temperature, in response to generation of the trigger signal. In step 402, the temperature measurement device 23 receives the instruction, and measures temperature in the housing 11.

In step 403, the temperature correction control unit 29 determines whether the temperature measured by the temperature measurement device 23 is a determined temperature. Whether the temperature is a determined temperature can be determined based on determination as to whether a value has been set in the field of a determined frequency corresponding to the temperature in the table for managing calibration values.

If it is determined in step 403 that the temperature is a determined temperature, the temperature correction control unit 29 refers to the table in step 404, acquires a determined frequency corresponding to the temperature, and notifies the operation control unit 25 of the determined frequency which has been acquired. The operation control unit 25 sets the determined frequency which has been notified, and controls the frequency of a voltage to be input to the emission device 18. In step 405, the emission device 18 receives a voltage with the set frequency, and emits infrared rays according to the voltage. Then, the detection device 19 receives reflected infrared rays. In this way, the detection process is performed. The detection process is the process from step 305 to step 307 in FIG. 14.

In step 406, based on the quantity of received light, the operation control unit 25 and the dimension detection unit 26 output results of detection as to, for example, whether an insect pest has entered, and store the results of detection in the memory 21. In step 407, the temperature correction control unit 29 refers to the detection results to confirm whether an insect pest has not entered and accordingly the detection results indicate that an insect pest has not been detected. If an insect pest has not been detected, the process proceeds to step 408. If an insect pest has been detected, the process proceeds to step 409.

In step 408, the temperature correction control unit 29 shifts provisional frequencies entered in the table to the column for determined frequency of the same table. Then, the process proceeds to step 411, where the process is terminated.

In step 409, the temperature correction control unit 29 deletes all the provisional frequencies entered in the table. Then, the process proceeds to step 411, where the process is terminated.

If it is determined in step 403 that the temperature is not a determined temperature, the process proceeds to step 410, where a provisional determination process is performed. The provisional determination process is a process from step 309 to step 314 in FIG. 14. After the provisional determination process is completed, the process proceeds to step 411, where the process is terminated.

FIG. 17 is a diagram illustrating an example of the table for managing calibration values at the time of shifting provisional frequencies as determined frequencies. As illustrated in FIG. 11, initialization was performed at 20° C. In a calibration process performed after a certain period of time, a temperature of 24° C. was measured, and a provisional frequency of 38.9 kHz was obtained at 24° C., as illustrated in FIG. 15. In a calibration process performed after another certain period of time, a temperature of 20° C. was measured, and there was obtained a detection result indicating that no insect pest had been detected.

Therefore, it can be determined that no insect pest had been detected also in the calibration process performed at 24° C. Thus, the provisional frequency of 38.9 kHz obtained at 24° C. as illustrated in FIG. 15 is shifted to the field of a determined frequency corresponding to the same temperature, that is, 24° C. as illustrated in FIG. 17.

As a result of shifting the provisional frequency to the field of determined frequency, fields corresponding to 24° C. and 26° C. contain determined frequencies. Meanwhile, the field of a determined frequency corresponding to 25° C. between the fields corresponding to 24° C. and 26° C. is left blank. Referring to the table, determined frequencies corresponding to 24° C. and 26° C. are both 38.9 kHz. Assume that, as described above, the field of a determined frequency corresponding to a certain temperature is left blank, and that the same frequencies have been entered in the fields of determined frequencies corresponding to temperatures of 1° C. above and below the certain temperature. In such a case, it can be determined that a determined frequency corresponding to the certain temperature is equal to the determined frequencies corresponding to the temperatures of 1° C. above and below the certain temperature.

Therefore, it is determined that a determined frequency corresponding to 25° C. is 38.9 kHz, which is equal to the determined frequencies corresponding to 24° C. and 26° C. Thus, the value "38.9 kHz" is entered in the field of a determined frequency corresponding to 25° C. as illustrated in FIG. 17.

Parameters such as a frequency corresponding to each temperature are thus determined and entered at any time to fill the table with determined frequencies. It is thus possible to set a determined frequency corresponding to a measured temperature and perform a detection process. Thus, even if the temperature changes, it is possible to output a detection result while reducing detection errors.

Figure 18:
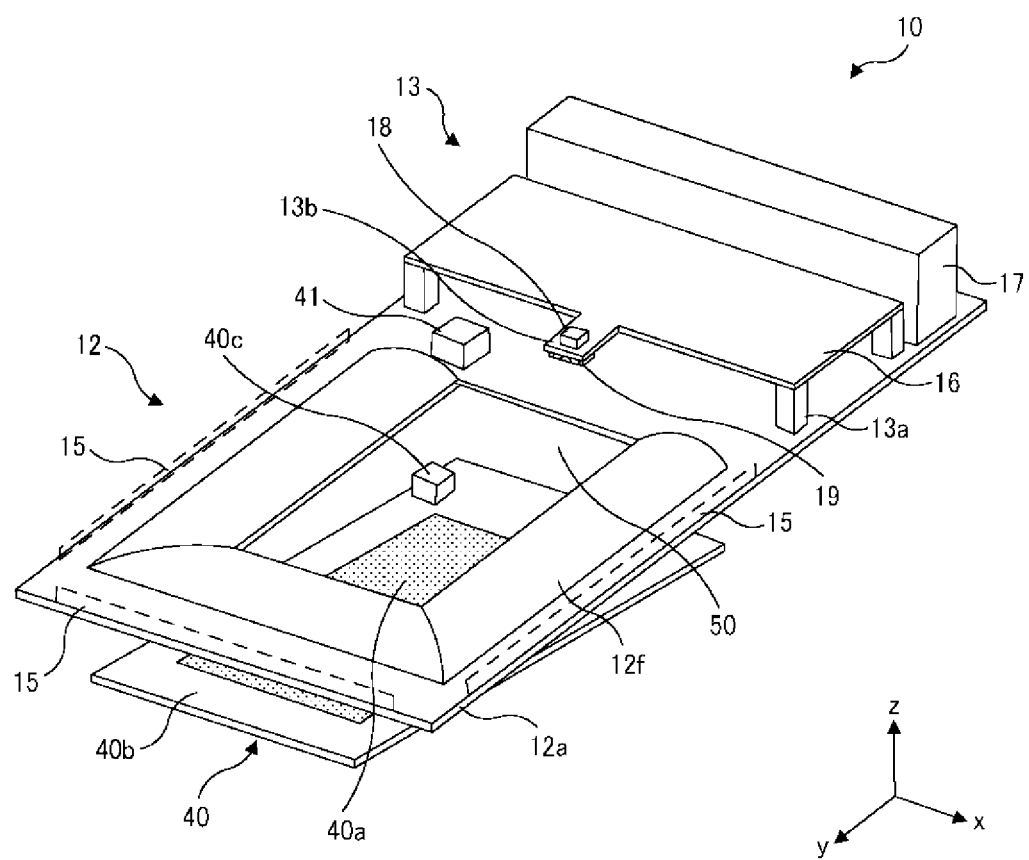
FIG. 18 is a perspective view of another example of the inside of the detection apparatus, according to an embodiment of the present disclosure.

FIG. 18 is a perspective view of another example of the inside of the detection apparatus 10. The detection apparatus 10 includes the object detecting part 12 and the device part 13. In addition, the detection apparatus 10 further includes a trap 40 for capturing insect pests and a switch 41 for attaching and detaching the trap 40. The object detecting part 12 and the device part 13 have already been described. Therefore, the following description is focused on the trap 40 and the switch 41.

The trap 40 includes an adhesive part 40a, a peripheral part 40b, and a protrusion 40c. The adhesive part 40a captures insect pests. The peripheral part 40b surrounds the adhesive part 40a, and is adjacent to the lower surface of the bottom wall 12a. The protrusion 40c protrudes in the z-axis direction from the peripheral part 40b. The bottom wall 12a has an opening 50 in its center. For example, the opening 50 has a rectangular shape and a predetermined size. When the peripheral part 40b of the trap 40 is adjacent to the lower surface of the bottom wall 12a, the adhesive part 40a is exposed in the opening 50. The adhesive part 40a is formed with, for example, an adhesive sheet attached to the central part of the trap 40 having a plate-like shape.

The switch 41 is provided on the bottom wall 12a, and includes an insertion part into which the protrusion 40c is inserted. When the protrusion 40c is inserted into the insertion part, the switch is turned on. When the protrusion 40c is pulled out of the insertion part, the switch is turned off. Note that this is an example, and the structure is not limited to this example.

The switch 41 can also function as a power switch. In this case, the trap 40 can be removed to turn the power off, and the trap 40 can be attached to turn the power on. For example, the protrusion 40c has a conductive part. The switch 41 has two contacts. When the protrusion 40c is inserted into the insertion part to attach the trap 40, the two contacts and the conductive part are connected to establish an electrical connection. Thus, the power can be turned on. Meanwhile, when the protrusion 40c is pulled out of the insertion part to remove the trap 40, the electrical connection is disconnected. Thus, the power can be turned off. In this way, the switch 41 functions as a power switch. As a result, when the trap 40 is attached, the power is turned on. Thus, it is possible to start with initialization.

When the trap 40 is replaced, variations in the shapes of the traps or other reasons cause a difference between the state of the detection space before replacement and the state of the detection space after replacement. This also causes a change in the quantity of received infrared rays. Therefore, when the trap 40 is replaced, the power is once turned off and then turned on. As a result, it is possible to restart with the initial calibration process as an initialization process.

At this time, a result of the initial calibration process is output, and can be notified to an external data server or the like, together with a flag indicating the result of the initial calibration process. Receiving this notification, the data server or the like can record the date and time of replacement of the trap 40.

The present disclosure has been described thus far based on the embodiment set forth above as a detection apparatus, a detection system, and a detection method. However, the present disclosure is not limited to the above-described embodiment, and other embodiments, additions, modifications, deletions, and the like can be made within a scope that can be conceived by those skilled in the art. In addition, any aspect is included in the scope of the present disclosure as long as the operations and effects of the present disclosure are achieved.

Therefore, it is possible to also provide, for example, a program for implementing each function of the above-described control device, a recording medium on which the program is recorded, and a server device that stores the above-described program and provides the program in response to a download request. Furthermore, the detection system may include the above-described data server or the like.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to 35 U.S.C. § 119(a) to Japanese Patent Application Nos. 2019-047525, filed on Mar. 14, 2019, and 2019-202919, filed on Nov. 8, 2019, in the Japan Patent Office, the entire disclosures of which are incorporated herein by reference.

REFERENCE SIGNS LIST

10 Detection Apparatus
11 Housing
12 Object Detecting Part
12a Bottom Wall
12b Upper Wall
12c to 12e Side Wall
12f Raised Portion
12g Detection Space
13 Device Part
13a Support Leg
13b Protrusion
14 Partition Wall
15 Opening
16 Control Board
17 Power Source
18 Emission Device
19 Detection Device
20 Control Device
21 Memory
22 Input/Output Device
23 Temperature Measurement Device
25 Operation Control Unit
26 Dimension Detection Unit
27 Timer unit
28 Adjustment Unit
29 Temperature Correction Control Unit
30 Resistor
31 Infrared LED
32 Switching Element
33 PIN Photodiode
34 I-V Converter
35 Amplifier
36 Band-Limiting Filter
37 Demodulator
40 Trap
40a Adhesive Part
40b Peripheral Part
40c Protrusion
41 Switch
50 Opening

The invention claimed is:

1. A detection apparatus for detecting an object, the detection apparatus comprising:
a housing including an inner surface whose reflectance is equal to or lower than a certain value;
an emitter to emit infrared rays into the housing;
a sensor to detect infrared rays and output a result of detection;
one or more processors configured to adjust an intensity of reflected infrared rays according to the result of detection by the sensor,
a temperature sensor configured to measure a temperature in the housing,
wherein:
the one or more processors are further configured to determine whether a value adjusted by the one or more processors is valid at the temperature measured by the temperature sensor,
the one or more processors are further configured to determine that the value adjusted by the one or more processors is valid when the value has been adjusted in a state where the object is not present in the housing, and causes a memory to store the value as a determined value in association with the temperature measured by the temperature sensor, and
in a case where the memory stores no determined value for the temperature measured by the temperature sensor, the one or more processors are further configured to cause the memory to store the value adjusted by the one or more processors as a provisional value in association with the temperature.

2. The detection apparatus according to claim 1, wherein:
the emitter emits infrared rays modulated in response to an input of a rectangular wave, and
the one or more processors are further configured to adjust a frequency of the rectangular wave such that the intensity of reflected infrared rays is kept at a predetermined threshold value in a state where the object is not present in the housing.

3. The detection apparatus according to claim 1, wherein:
the emitter emits infrared rays modulated in response to an input of a rectangular wave, and
the one or more processors are further configured to adjust a pulse width of the rectangular wave such that the intensity of reflected infrared rays is kept at a predetermined threshold value in a state where the object is not present in the housing.

4. The detection apparatus according to claim 1, wherein:
the emitter emits infrared rays according to an amount of input current, and
the one or more processors are further configured to adjust the amount of input current such that the intensity of reflected infrared rays is kept at a predetermined threshold value in a state where the object is not present in the housing.

5. The detection apparatus according to claim 1, wherein:
the emitter emits infrared rays modulated in response to an input of a rectangular wave,
the sensor includes an amplifier configured to amplify a detection amount of infrared rays, and
the one or more processors are further configured to adjust an amplification factor of the amplifier such that the intensity of reflected infrared rays is kept at a predetermined threshold value in a state where the object is not present in the housing.

6. The detection apparatus according to claim 2, wherein:
the detection apparatus detects the object according to whether the intensity of reflected infrared rays has exceeded the threshold predetermined value.

7. The detection apparatus according to claim 1, wherein:
the one or more processors are further configured to set a value measured in advance at each temperature as an assumed value corresponding to each temperature, cause the memory to store the assumed value in association with each temperature, and set a value obtained based on the assumed value in consideration of a case error as a reference value.

8. The detection apparatus according to claim 1, wherein:
the one or more processors are further configured to calculate an assumed value from a calculation formula derived based on a value measured in advance at each temperature, and set, as a reference value, a value obtained based on the assumed value in consideration of a case error.

9. The detection apparatus according to claim 7, wherein:
an adjustment parameter, as the assumed value, corresponding to each temperature is selected from among a frequency of a rectangular wave that is input for emitting the infrared rays, a pulse width of the rectangular wave, and an amplification factor of an amplifier configured to a detection amount of the infrared rays, and
the one or more processors are further configured to determine a fixed value in a case where an adjustment parameter other than the selected adjustment parameter is set as the fixed value.

10. The detection apparatus according to claim 7, wherein:
the one or more processors are further configured to control the emitter or the sensor by use of a determined value or a reference value stored in association with a temperature closest to the temperature measured by the temperature sensor, in a case where a memory stores no determined value, which is a value determined to be valid, for the temperature measured by the temperature sensor.

11. The detection apparatus according to claim 1, wherein:
in a case where the memory stores the determined values for the temperatures measured by the temperature sensor and the object has not been detected in a process for detecting the object, the one or more processors are further configured to change each of the provisional values associated with each of the temperatures stored currently to each determined value, and cause the memory to store each determined value in association with each of the temperatures.

12. The detection apparatus according to claim 1, wherein:
the object is an insect pest,
the detection apparatus further comprises:
a trap configured to capture the insect pest, the trap being replaceably attached to the housing; and
a switch configured to turn power off when the trap is removed from the housing, and turn the power on when the trap is attached to the housing, and
the one or more processors are further configured to perform an initialization process for making adjustment so as to keep the intensity of reflected infrared rays at a predetermined value in a state where the object is not present in the housing, each time the trap is replaced.

13. A detection system for detecting an object, the detection system comprising:
a housing including an inner surface whose reflectance is equal to or lower than a certain value;
an emitter to emit infrared rays into the housing;
a sensor to detect infrared rays and output a result of detection; and
one or more processors configured to adjust an intensity of reflected infrared rays according to the result of detection by the sensor,
a temperature sensor configured to measure a temperature in the housing,
wherein:
the one or more processors are further configured to determine whether a value adjusted by the one or more processors is valid at the temperature measured by the temperature sensor,
the one or more processors are further configured to determine that the value adjusted by the one or more processors is valid when the value has been adjusted in a state where the object is not present in the housing, and causes a memory to store the value as a determined value in association with the temperature measured by the temperature sensor, and
in a case where the memory stores no determined value for the temperature measured by the temperature sensor, the one or more processors are further configured to cause the memory to store the value adjusted by the one or more processors as a provisional value in association with the temperature.

14. A detection method, comprising:
emitting infrared rays from an emitter into a housing with an inner surface having a reflectance equal to or lower than a certain value;
detecting infrared rays by a sensor and outputting a result of the detecting; and
detecting the object based on the result of detection output by the sensor,
measuring a temperature in the housing, determining whether a value which has been adjusted is valid at the temperature which has been measured, determining that the value which was adjusted is valid when the value has been adjusted in a state where the object is not present in the housing, and causes a memory to store the value as a determined value in association with the temperature which was measured, and in a case where the memory stores no determined value for the temperature which was measured, causing the memory to store the value which was adjusted as a provisional value in association with the temperature, wherein the detection method further comprises:

adjusting an intensity of reflected infrared rays according to the result of detection by the sensor.

* * * * *